Sept. 8, 1936. G. SPATTA Re. 20,103
AXLE CASING AND METHOD OF MAKING THE SAME
Original Filed Dec. 26, 1929 2 Sheets-Sheet 1
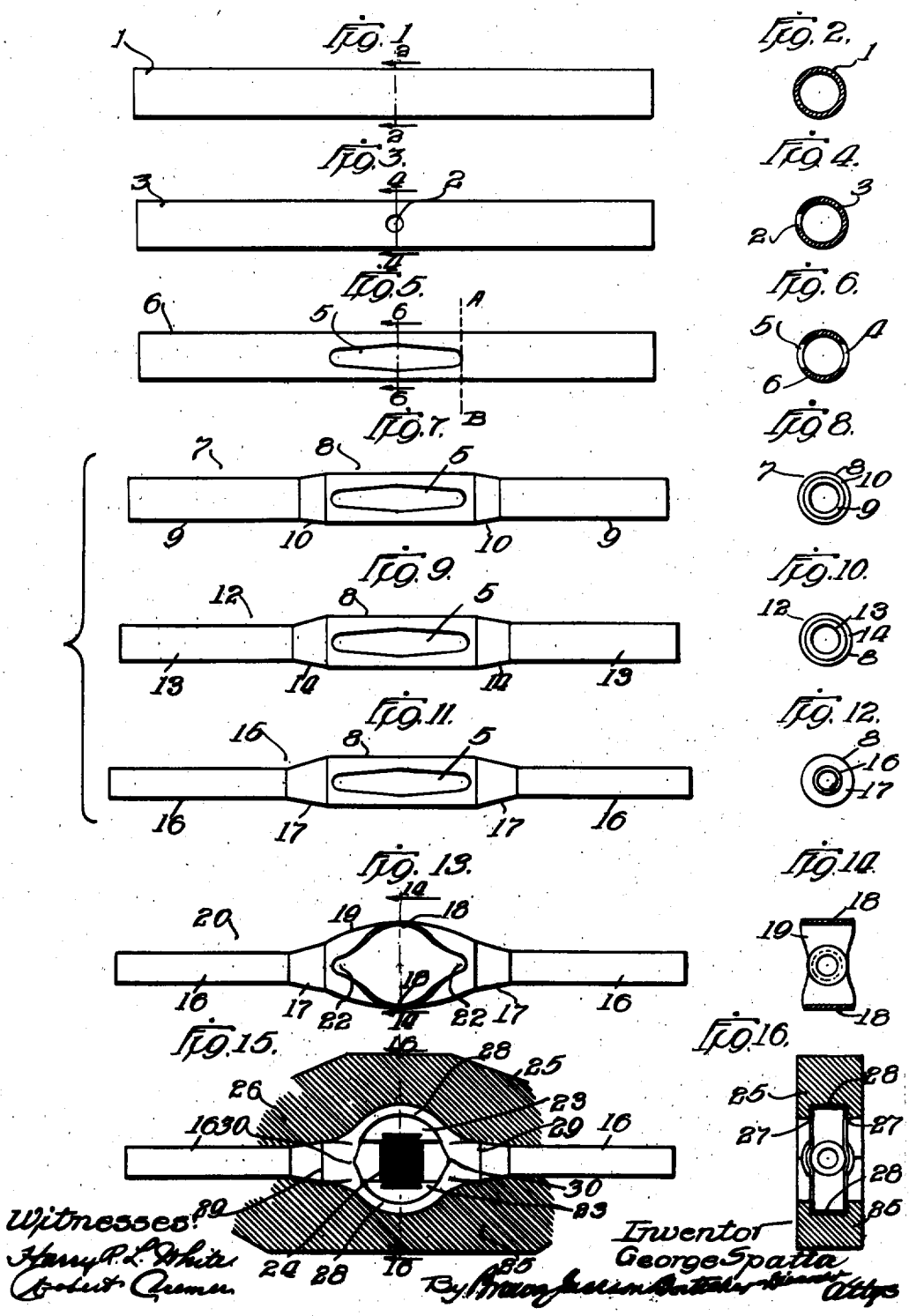

Sept. 8, 1936. G. SPATTA Re. 20,103
AXLE CASING AND METHOD OF MAKING THE SAME
Original Filed Dec. 26, 1929 2 Sheets-Sheet 2
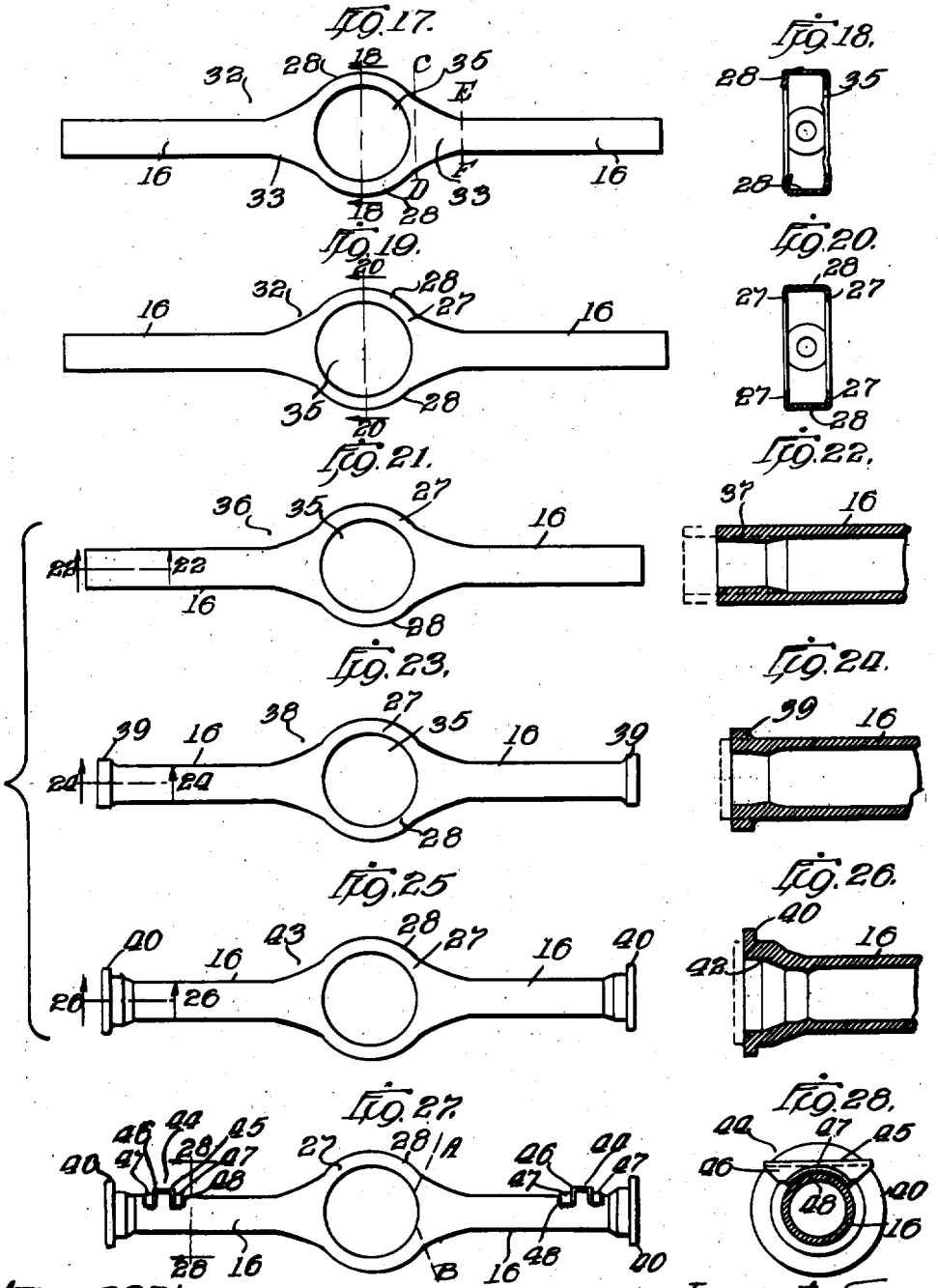
Witnesses:
Harry R. L. White
Robert Cramer
Inventor:
George Spatta
By Brown, Jackson, Boettcher & Dienner
Attys.

Reissued Sept. 8, 1936

Re. 20,103

UNITED STATES PATENT OFFICE 20,103

AXLE CASING AND METHOD OF MAKING THE SAME

George Spatta, Buchanan, Mich., assignor to Clark Equipment Company, Buchanan, Mich., a corporation of Michigan Original No. 1,926,353, dated September 12, 1933, Serial No. 416,537, December 26, 1929. Application for reissue June 12, 1935, Serial No. 26,225

21 Claims. (Cl. 29—153.1)

My invention relates to axle casings and the method of making the same.

It is old to construct a rear axle casing or housing from a piece of tubing. My present invention proceeds, however, upon the concept of such a process of construction as will produce a satisfactory product for the purpose intended and in which process the steps are peculiarly adapted for machine operation.

Those familiar with present methods of mass production recognize the desirability of reducing any manufacturing process to such operations as involve a low or minimum labor cost in the final cost price. This requires a carefully engineered process and plant, entailing a minimum of hand operations and the maximum employment of machinery. The use of machinery involves skilled operators and careful supervision of all operations. Thus, a part of the cost reduction which is gained by elimination of hand operations by unskilled operators is lost by the employment of machinery under skilled operators, which are necessarily higher priced. However, it is the general experience that a higher paid machine operator can, under properly engineered plant and process conditions, perform far more work than lower priced labor with hand operations.

I have aimed, in the present invention, to provide a process, a plant and a product which will permit of the manufacture of a strong, light and highly satisfactory rear axle housing or casing at a high rate of production and at low cost.

In brief, the present application is directed to the product and the process of making the same. The plant, including a relatively large number of machines, some of which are new and some of which are old, is covered by a series of copending applications, to which reference will be made hereafter more in detail for an explanation of any peculiarities in the individual steps, or the manner of their performance.

According to the present invention I produce a blank which has a wall thickness substantially the same as the final wall thickness of the banjo frame. The ends of this tube are shrunk to reduce the diameter to the desired size. This increases the wall thickness of the arms. Such increase of the wall thickness of the arms of the housing provides a slightly greater strength than is required through a part of the length, but it is advantageous at the extreme outer ends, where the flange for attaching the brake drum and the enlarged seats for the wheel bearings are to be formed. The flange and brake drum and seats for the bearings require extra metal to be secured for their formation and this metal is gathered by endwise swaging. This operation of endwise swaging and expanding is more readily performed in one heat, when the walls of the arms are relatively thick. Hence, while there apparently is slightly more metal in the arms than is necessary for strength, the resultant product is secured with fewer operations and hence at lower cost.

Now, in order to acquaint those skilled in the art with the manner of constructing the housing of my invention according to the process of my invention, I shall describe, in connection with the accompanying drawings, a typical manner of producing the housing according to the present invention.

In the drawings:

Figure 1 is a side elevational view of the tubular blank.

Figure 2 is an end view of the same.

Figure 3 is a side elevational view of the blank with the initial perforations formed in one wall thereof.

Figure 4 is a section taken on the line 4—4 of Figure 3.

Figure 5 is a side elevational view of the blank after the slotting operation.

Figure 6 is a section on the line 6—6 of Figure 5.

Figure 7 is a side elevational view of the blank after the first operation of shrinking the arms on each side of the slotted central portion.

Figure 8 is an end elevational view of the same.

Figure 9 is a side elevational view of the blank after the second shrinking operation.

Figure 10 is an end elevational view of the same.

Figure 11 is a side elevational view of the blank after the third shrinking operation.

Figure 12 is an end elevational view of the same.

Figure 13 is a side elevational view of the blank after the slotted central portion is spread out for the insertion of a forming die.

Figure 14 is a section of the same, taken on line 14—14 of Figure 13.

Figure 15 is a side elevational view of the blank after the forming operation of the banjo frame portion.

Figure 16 is a cross section taken on the line 16—16 of Figure 15.

Figure 17 is a side elevational view of the blank after the throating, or throat-forming operation.

Figure 18 is a cross sectional view taken on the line 18—18 of Figure 17.

Figure 19 is a side elevational view of the blank after flattening and machining out the flanges of the banjo frame.

Figure 20 is a cross sectional view taken on the line 20—20 of Figure 19.

Figure 21 is a side elevational view with a part of one arm broken away after the first swaging operation on the ends of the blank.

Figure 22 is a sectional view taken on the line 22—22 of Figure 21.

Figure 23 is a side elevational view of the blank after the second swaging operation on the ends of the arms.

Figure 24 is a section taken on the line 24—24 of Figure 23.

Figure 25 is a side elevational view of the blank after the third swaging operation on the ends of the arms for producing the brake drum attaching flange and for forming the bearing seats.

Figure 26 is a section taken along the line 26—26 of Figure 25.

Figure 27 is a side elevational view of the housing, showing the spring-seat welded onto the axle arms.

Figure 28 is a sectional view taken on the line 28—28 of Figure 27.

In the production of the casing herein illustrated the first step is the production of the tubular blank 1, shown in Figs. 1 and 2. The character of the finished casing to be produced controls the character of the blank which is to be produced. Hence the production of the blank must be controlled to suit the form, size, weight, etc., of the final casing to meet the requirements of the customer.

In one typical example I produce a tubular blank 55 inches long, 4¾" outside diameter with a $\frac{3}{16}$" wall thickness. The tube may be seamless or may be welded and it should have a certain degree of hardness approximating a Brinell test of 150 (between 140 and 150) as will be apparent from the following description.

The blank must undergo considerable working and particularly the shrinkage of the arms as shown in Figs. 7 to 12, which compacts and hardens the metal, and which is performed cold, requires a relatively closely controlled quality and type of blank.

The blank 1 may be produced by cutting off a length of seamless or welded tubing which is suitably drawn or formed, as now known to the prior art, or I may form the relatively short length of tubing which is required by deep drawing, or by extrusion.

The wall thickness of the blank 1 has a certain relation to the finished casing, which I shall now explain.

Consider the finished casing shown in Fig. 27; the section on the line A—B represents approximately the critical section and this corresponds to the critical section shown on line A—B of Fig. 5. That is to say, the maximum spread of metal is on line A—B of Fig. 27 and the metal must be present in the blank on the line A—B of Fig. 5 in order to produce successfully the finished article. If there is sufficient metal on the section A—B of Fig. 5 to produce the required thickness of wall on the line A—B of Fig. 27 then there is ample metal for all other parts of the casing.

The first step is, therefore, the production of a suitable tubular blank as shown in Figs. 1 and 2.

The next main step is the step of slotting the tube as shown in Figs. 5 and 6. In order to accomplish this slotting the tube blank 1 is first put upon a horn die and an external punch punches the perforation 2. The perforated blank 3 is then slipped over a horn punch and the pressure pin projects through the perforation 2 to drive the horn punch through the bottom wall of the tube to form the slot 4. The tube is then turned 180 degrees on the horn punch and the pressure pin again actuates the punch to produce the slot 5 which is accurately in register with the slot 4. This leaves the slotted blank 6.

It will be observed that the slots are slightly wider at the center than at the ends. The shape of the slots is designed to give a proper distribution of the metal so that the edges of the slots 4 and 5 will, under the treatment hereinafter described, define circular openings for the banjo frame, leaving substantially uniform width of flange at the banjo frame opening.

The blank 6 is then gripped at the central part and ring dies for shrinking the ends of the tube are then passed over the ends of the tube in a first shrinking operation, leaving the piece in the form shown in Figs. 7 and 8. This constitutes the blank 7. The blank has now assumed three distinct parts, namely, the central portion 8, from which the major part of the banjo frame is later constructed, the arms 9—9 of reduced diameter, and the tapered intermediate or throat portions 10—10 which form the junction between central portion 8 and the arms 9—9.

The central portion 8 is of the original diameter of the blank 1. The ring dies, which are pressed towards each other by hydraulic pressure as will be disclosed more fully in co-pending application Case 15, have tapered forward ends which form the intermediate or throat portions 10.

The shrinkage of the arms 9—9 to their final diameter is accomplished in three stages. The first stage is shown in Figs. 7 and 8. The second stage is shown in Figs. 9 and 10 and the third stage is shown in Figs. 11 and 12. The piece 7 is longer than the blank 1 or the pieces 3 or 6, which are of the same length as the blank 1, and this increase in length is produced by the first arm shrinking operation of the dies aforesaid. The piece 12 which results from the second arm shrinking operation leaves the central portion 8 substantially as it was in Fig. 7, the arms have been reduced in diameter and increased in length, as shown in 13—13 in Fig. 9 and the throat, or joining portions 14—14 have likewise been increased in length.

The third arm shrinking operation produces the piece 15 shown in Figs. 11 and 12. In this case the central portion 8 remains the same, the arms 16—16 have now been brought to their final diameter and again increased in length, while the throat portions 17—17 are likewise increased in length.

The piece 15 is then removed from the shrinking clutch and the central portion 8 is subjected to a spreading action by thrusting a cylindrical member through the slots 4 and 5. The forward end of the cylindrical member is tapered so as to enter the slots readily and the cylindrical parts lying outside of the slots 4 and 5 are spread out substantially flat at the center of the piece, as shown at 18—18 in Figs. 13 and 14.

The theory of spreading out the central part into the form shown at 19 in Figs. 13 and 14 is, first of all, to provide a large enough opening within which to insert forming die members and next to throw the metal into a shape where it can be more easily brought to the banjo frame shape shown in Figures 15 and 16.

The operation of spreading the central part 8 and of forming the banjo frame as shown in Figs. 15 and 16, to which reference will be made later, is carried out as a hot-forming operation. That is to say, the central part of the blank, including the throat portions 17—17 and the central portion 8, or Fig. 11, are locally heated in a suitable furnace and the spreading and forming of Figs. 13 to 16 is performed at one heat. It will be observed that at the central portions 18—18 the walls of the tube have been flattened out in lines transverse to the longitudinal axis of the piece 20.

Since the portions at 18—18 were originally cylindrical, concentric with the longitudinal axis of the piece, and have now been changed to cylindrical in a transverse direction, it will be noted that the edges of the opening have been stretched. This stretching occurs chiefly at two places, namely, at the portions 18—18 and at the ends of the slots, as indicated at 22—22. This can be observed in the actual operation of spreading the slotted portions by noticing the manner in which the scale cracks off of the metal.

The perimeter of the slots 4 and 5 is substantially the perimeter of the formed flanges as shown in Figs. 15 and 16, for while some stretching occurs in the operation indicated at Fig. 13, also some contraction of shrinkage occurs in folding over the flanges into the shape shown in Figs. 15 and 16.

Immediately after opening up the slotted central portions into the shape shown at 19 in Fig. 13, the piece 20 is then placed over a forming die having two semi-circular pieces 23—23 adapted to be spread by a wedge member 24, the central part of the piece being first engaged externally by the flanging dies 25—25, which are held yieldingly towards each other and which are forced away from each other by the internal expanding die members 23—23 under the action of the wedge member 24.

The process of spreading open the slots as shown in Figs. 13 and 14 is disclosed in detail in my co-pending application Case 17 and the forming operation shown in Figs. 15 and 16 is described in detail in my co-pending application Case 18.

The sequence of operations in detail in forming the piece 26 shown in Figs. 15 and 16 is first to insert the die members 23 on the inside, in collapsed or contracted position, the wedge member 24 being withdrawn; then the external die members 25—25 are closed over the central part of the banjo frame to turn the edges of the metal inwardly for forming the flanges 27—27, then the wedge member 24 is brought between the die members 23—23, pushing these members 23—23 apart and carrying the die members 25—25 outwardly against a yielding resistance of a hydraulic cylinder.

In practice the two operations are carried on substantially simultaneously in that the die jaws 25—25 approach each other and the die members 23—23 are spread apart substantially simultaneously. The result is a substantially cylindrical flanged portion on each side.

This forming of the transverse cylindrical flanged portions 28—28 to shape them into the banjo frame is accompanied by a partial folding in of the throat portions 29—29 although the major part of the conical throat portion is of a diameter larger than the depth of the banjo frame portions 28—28. Upon considering the sizes of the respective parts this will become apparent. The arms 16—16 have been reduced to their final diameter and the banjo frame portions 28—28 are of a depth which is substantially equal to the outside diameter of the arms 16—16.

Since the conical tapered portions 17—17 shown in Fig. 13 had, at their smaller end, the same diameter as the arms 16—16 and had at their larger end the diameter of the original blank 1, it will be seen that reducing the banjo frame portions 28—28 to the diameter of the arms 16—16 has pulled in—that is, towards the axis—the inner edges 30—30 of the throat portion. However, the throat portion cannot well be formed at this operation because the outward movement of the die members 23—25 on each side has tended to pull the edges 30—30 into alignment with the flanges 27—27 and has tended to open outwardly, by the outward pulling action of the pairs of die members 23—25, in the plane of a taper as shown in Fig. 15. That is to say, the separation of the pairs of die members 23—25 which grip between them the banjo frame portions 28—28 tends to pull in the sides and pull out the tops and bottoms of the throat portions 29—29. The result is the throat portions 29—29 are still bulged outwardly at their centers, are pulled into line with the flanges 27—27 at their edges and have assumed a somewhat rectangular conformation where they join the banjo frame portions 28—28.

The next operation is a throat forming operation, the resultant piece being shown in Figures 17 and 18. This throat forming operation is disclosed and claimed specifically in my co-pending application, Case 19.

The theory of the throat forming operation is to change the shape of the throat so that at the section C—D the shape is substantially rectangular, whereas at the section E—F the section is circular.

The throat forming operation is performed, as will be more easily understood from the said co-pending application, by placing the piece 26, as shown in Fig. 15, in a tubular external die and inserting an internal conical or tapered die member on the inside and pulling the same toward the end of the arm. This operation is performed on each side of the banjo frame so as to form the throat into the shape shown in Figs. 17 and 18. This operation smooths the throat and leaves the thickness of the piece substantially uniform at the critical section.

This throating operation is carried out cold, since it amounts merely to pressing the metal to the desired shape rather than any appreciable working of the metal.

The piece 32 has now its banjo frame portion substantially in finished form, so far as working of the metal is concerned.

The next step is to trim the flanges 27—27 substantially concentric with the portions 28—28, since further operations are now gauged from the banjo frame.

The piece 32, shown in Figs. 19 and 20, is the same piece as shown in Figs. 17 and 18 with the banjo frame bored out as by a rotating cutting tool or the like.

If desired the flanges 27—27 may be flattened out before the trimming or boring operation but this is not generally necessary.

The piece 32 is then passed through a furnace which heats one end of the arm, or if desired, both ends may be heated simultaneously, and therefrom the ends of the arms 16 are forged in a series of operations.

The arm 16 which is to be forged is gripped in a particular position which is gauged from the banjo frame 35 and then, by endwise forging, the walls of the arm 16 are thickened as shown in Fig. 22.

Both arms are thus treated, thereby producing the relatively shorter piece 36, shown in Figs. 21 and 22, with the increased thickness of metal secured at the ends of the arms by gathering the same inwardly. This is plainly shown at 37 in Fig. 22. The dotted line showing in Fig. 22 illustrates the original length of the arm 16 and the increased thickness secured is from the metal which is gathered from the dotted portion.

The piece 36 is then transferred, while still hot, to the next set of forming dies where the arm 16 is further shortened and more metal gathered, as shown in section in Fig. 24. The metal which is gathered from the dotted line portion is partially thrown outwardly to form the flange 39 as shown in Fig. 24.

The piece 38, shown in Figs. 23 and 24 is immediately transferred to the next set of dies where the end of the arm 16 is completed by the final forging operation to shape the metal as shown in section in Fig. 26. Further metal is gathered, as indicated from the dotted line outline of Fig. 26 and this metal is thrown, with the other gathered metal into the full line section shown in Fig. 26, the flange 40 being increased in diameter and reduced in thickness and an internal seat 42 is formed for housing the wheel bearings.

The seat 42 for the bearings and the flange 40, for attaching the brake drum or the like, are later finished by machining. The wall thickness at and adjacent the seat for the wheel bearings is slightly in excess of the thickness of the arms. This is advisable to provide sufficient metal for finishing the bearings seat, the flange 40 and the end face of the arm.

The piece 43, as shown in Figs. 25 and 26 is substantially complete so far as forging is concerned. The outer face of the flanges 27—27 are adapted to be finished in parallel planes for the bolting of a differential frame and a cover-plate upon opposite sides of the housing.

The flanges 27—27 may be subjected to a flattening treatment which consists in laying the flange flat upon an anvil or other flat supporting surface and hammering the inside of the flange flat against the anvil, as by means of an air-hammer or the like, which reaches inside of the banjo frame and strikes the inner surface of the flange 27 to be straightened. This operation is performed upon each flange 27 prior to machining of the outer surfaces.

Also, if desired, reinforcing rings made of flat plate stock may be welded to the inside surfaces of the flanges 27—27 to increase the stock which may be engaged by the tap screws which hold the cover-plate and the differential frame in place upon the banjo frame. Such reinforcing rings upon the inside of the flanges 27 are preferably applied in segment and hot-welded to the said flanges 27—27 prior to machining of the outer surface of the flanges. The flanges are then drilled and tapped.

The casing or housing is provided with spring seats 44—44 which are formed of thin plate stock, drawn to shape. The spring seat 44 is formed of a flat top or platform portion 45 which is adapted to be placed horizontally on the top side of the casing arm, in such position as to register with the rear spring of the vehicle. The platform 45 has integral depending walls 46—46 terminating in cylindrical saddle portions 47—47 which saddle portions have their edges welded as by electric arc welding to the adjacent surface of the rear axle housing arm 16.

Preferably in the commercial manufacture of the housings these spring seats are located by means of jig fixtures upon the housing arms 16—16 and are tacked to the housing arms 16—16 by hand applied arc or gas weld to hold the spring seats properly in place upon the arms 16—16 and thereupon the housing, with the spring seats tacked thereupon is placed in a suitable fixture and the four cylindrical edges are welded simultaneously to the arms 16—16 in an electric welding machine.

The welding of the spring seats is performed preferably after the machining of the surfaces of the banjo frame and the ends of the arms, so that the location of the spring seats is accurately disposed with respect to the finished surfaces of the housing. However, this is not essential, as it is within the scope of my invention to weld the spring seat to the housing prior of the finishing of the surfaces to be machined, or any part of them.

It will be observed that the finished housing or casing is light and strong, the critical section on line A—B of Fig. 27 contains the original metal of the tube on substantially line A—B of Fig. 5. The metal of the original blank or tube 1 is sufficient to provide the critical section, without appreciable diminution or weakening and the metal of the casing throughout has been worked and compacted. The result is a light, strong casing, costing less to produce than any casing of the same strength now on the market. For its weight the present axle casing has a strength far in excess of anything now found on the market. This is highly advantageous in that it reduces the unsprung weight of the rear axle construction.

I do not intend to be limited to the precise order of the steps heretofore described nor to the exact mode of procedure herein related, as it will be apparent to those skilled in the art that certain deviations therefrom are permissible within the teaching of my invention.

The forging steps shown in Figs. 21 to 26 are disclosed and claimed in detail in my co-pending application Case 22. The flattening of the flange of the banjo frame is disclosed and claimed in detail in my co-pending Case 20.

The step of welding the spring-seat to the casing is disclosed and claimed in detail in my co-pending Case 23.

I claim:—

1. The process of forming a banjo frame axle housing which comprises; producing a tubular blank of substantially uniform diameter and wall thickness throughout, said tube having a wall thickness and perimeter of cross-section substantially the same as the wall thickness and perimeter of the throat of the finished banjo frame, slotting the tube to define a transverse banjo frame opening, the slot having a perimeter which is approximately equal to the perimeter of the opening of the banjo frame opening, shrinking the diameter of the arms to substantially the desired depth of banjo frame, thereby leaving tapered throat portions between the slotted part and the arms, spreading out flat in a transverse direction the cylindrical walls at the central part of the slot to stretch the edges of the metal defining the opening, and simultaneously spreading the banjo frame opening, throwing out the metal of the tube on each side of the slot into a transverse cylindrical shape on each side of the opening and folding the margin inwardly to form a banjo frame which is rectangular in cross-section and of a depth transversely substantially equal to the diameter of the arms, and shaping the throat to merge the rectangular banjo frame smoothly into the arms.

2. The process of forming a banjo frame axle housing which comprises; producing a tube of substantially uniform cross-section throughout and having a wall thickness and cross-sectional perimeter great enough to form the throat of the banjo frame, slotting the tube to define a transverse banjo frame opening of greater width at the center than at the ends, shrinking the diameter of the arms to substantially the desired depth of the banjo frame when finished, forming tapered throat portions between the slotted portion and the arms, folding out substantially flat the central part of the metal on each side of the slot and moving said flattened portions outwardly to increase the transverse opening, throwing outwardly the central part of the metal on each side of the slot to form the same into transverse cylindrical shape, folding the margins inwardly to form a banjo frame substantially rectangular in cross-section, shaping the throat on each side of the banjo frame to merge the rectangular banjo frame section smoothly into the cylindrical arm section, upsetting the end of each arm to gather metal, expanding said gathered metal into a flange and simultaneously forming an enlarged bearing seat in the end of the arm under the flange.

3. The process of constructing a hollow banjo frame axle housing from a tube, which comprises; slotting the central part of the tube to define the walls of a banjo frame to be formed, shrinking the arms on each side of the slotted portion, opening out the slotted central portion into transverse substantially cylindrical walls, then further enlarging the central part of the slotted portion and folding towards each other the margins of the slotted portions to define parallel flanges, then shaping the throat between banjo frame and arms to merge the rectangular banjo frame section into the circular arm section, then flattening the flange on each side of the banjo frame, then upsetting the end of an arm to increase the wall thickness, upsetting and expanding the thickened end of the arm to form a flange on the outside and an enlarged bearing seat upon the inside.

4. The method of forming a tubular banjo frame axle housing from a tubular blank which comprises slotting the central part of the tubular blank to form a crosswise banjo frame opening, increasing said opening by flattening crosswise the central part of the slotted walls, forming into cylindrical shape the slotted parts of the blank and folding the margins inwardly to define flanges, upsetting the end of each of the arms to gather metal and forming said metal into a flange and expanding the end of each of the arms under the flange to provide a bearing seat.

5. The method of making a banjo frame, which comprises forming a centrally slotted tubular blank, shrinking the diameter of the end portions on each side of the slotted portion to define arms of greater thickness than the thickness of the original blank, opening out substantially flat the slotted portion to permit the insertion of an expanding die, expanding the central part of the slotted portion and folding over the margins to form parallel inturned peripheral flanges to define a banjo frame, upsetting the ends of the arms to gather stock for forming flanges then throwing the gathered metal out into flanges on the ends of the arms.

6. The method of forming a banjo frame axle housing which comprises, producing a tubular blank slotted at the central portion and having a substantially uniform wall thickness throughout, shrinking the arms on each side to increase the thickness of the walls of the arms over the thickness of the walls of the central part, spreading out substantially flat the arcuate walls at the central part of the slotted portion to admit a forming die, forming the central slotted part into a transverse cylinder with inturned flanges, and forming integral flanges on the ends of the arms by endwise forging.

7. As a new article of manufacture, a banjo-type axle housing formed from a tubular blank and having the central part of the blank expanded into a banjo frame opening and provided with tubular extending arms having at their ends thickened, solid, integral flanges, said flanges being formed by upsetting the metal of said housing ends to a thickness greater than that of the remainder of said ends.

8. In a method of forming banjo-type axle housings, the steps which consist in forming a tubular blank into a housing having a central banjo frame portion and having oppositely extending ends of tubular cross section and upsetting the metal at the extremity of said ends to provide thickened, solid, integral, annular flanges at each extremity of the housing.

9. In a method of forming banjo-type axle housings from tubular blanks, the steps which consist in forming a housing having oppositely extending ends of tubular cross section defining therebetween a banjo-shaped differential casing, clamping one tubular end of such housing in a die and forcing a suitably shaped heading tool into the interior of said ends and upsetting the metal thereof to form an integral annular thickened flange on said end.

10. As an article of manufacture, a rear axle housing having tubular arm portions on opposite sides of an expanded central gear casing, each of said arm portions terminating at its outer extremity in a radially thickened flange joined to said arm portions by radially expanded and thickened bearing seat portions.

11. A rear axle housing comprising oppositely extending tubular arm portions having integral expanded throat portions at their inner ends conjointly defining a circular banjo frame, and upset radially expanded thickened bearing seat portions adjacent the outer ends of said arm portions terminating in radially extending thickened annular flanges.

12. A rear axle housing comprising a pair of alined arm portions expanded at their adjacent inner ends to define a gear casing having parallel flanged faces, the outer ends of said arm portions being thickened and enlarged radially to form reinforced bearing seats terminating at their outer ends in radial flanges of a thickness greater than the wall thickness of said arm portions.

13. As an article of manufacture, an axle housing of the type having a central differential casing and tubular oppositely extending arm portions, the outer extremities of said arm portions terminating in thickened radial flanges having radially enlarged and thickened bearing seat portions at their inner faces joining said flanges to said arm portions.

14. As an article of manufacture, an axle housing of the type having a central differential casing and tubular oppositely extending arm portions, the outer extremities of said arm portions having radially expanded bearing seat portions of a wall thickness greater than that of said arm portions and terminating in thickened radial flanges.

15. In a method of forming axle housings, the steps which consist in forming a banjo-type axle housing having oppositely extending tubular ends, clamping one tubular end of said housing in a die and forcing a suitably shaped heading tool into the interior of said end to form a preliminary upset, placing said end in a second clamping die and forcing a second heading tool into the interior thereof to form a flare at the extremity of said end and to shape said first flare into an intermediate shoulder, and placing said end in a third clamping die and forcing a third heading tool thereinto to shape said flare into an annular flange.

16. In a method of forming axle housings, the steps which consist in forming a banjo-type axle housing having oppositely extending tubular ends, clamping one tubular end of said housing in a die and forcing a suitably shaped heading tool into the interior of said end to form a preliminary upset, placing said end in a second clamping die and forcing a second heading tool into the interior thereof to form a flare at the extremity of said end and to shape said first flare into a thickener intermediate shoulder, and placing said end in a third clamping die and forcing a third heading tool thereinto to shape said flare into an annular flange.

17. In a method of forming axle housings, the steps which consist in forming a banjo-type axle housing having oppositely extending tubular ends, clamping one tubular end of said housing in a die and forcing a suitably shaped heading tool into the interior of said end to form a preliminary upset, placing said end in a second clamping die and forcing a second heading tool into the interior thereof to form a flare at the extremity of said end and to shape said first flare into a thickened intermediate shoulder, and placing said end in a third clamping die and forcing a third heading tool thereinto to shape said flare into a thickened annular flange.

18. In a method of forming axle housings, the steps which consist in forming a banjo-type axle housing having oppositely extending tubular ends, clamping one of such ends in a die and forcing a heading tool thereinto to form a preliminary upset spaced from the extremity of said tubular end, clamping said end in a second die and forcing a second heading tool thereinto to form said preliminary upset into a shoulder and to form a flare at the extremity of said tubular end, and clamping said tubular end in a third die and forcing a third heading tool thereinto to form said flare into a thickened annular flange, the plane of which is perpendicular to the axis of said tubular end.

19. As a new article of manufacture, a banjo-type axle housing formed at its ends with thickened, solid, integral flanges, said flanges being formed by upsetting the metal of said housing ends to a thickness greater than that of the remainder of said ends.

20. In a method of forming banjo-type axle housings, the steps which consist in forming a housing having oppositely extending ends of tubular cross section and upsetting the metal at the extremity of said ends to provide thickened, solid, integral, annular flanges at each extremity of the housing.

21. In a method of forming banjo-type axle housing, the steps which consist in forming a housing having oppositely extending ends of tubular cross section, clamping one tubular end of such housing in a die and forcing a suitably shaped heading tool into the interior of said end and upsetting the metal thereof to form an integral annular thickened flange on said end.

GEORGE SPATTA.